(12) United States Patent
Rudrapatna et al.

(10) Patent No.: US 8,171,634 B2
(45) Date of Patent: May 8, 2012

(54) METHOD OF PRODUCING EFFUSION HOLES

(75) Inventors: Nagaraja Rudrapatna, Mississauga (CA); Bhawan Patel, Mississauga (CA)

(73) Assignee: Pratt & Whitney Canada Corp., Longueuil (CA)

(*) Notice: Subject to any disclaimer, the term of this patent is extended or adjusted under 35 U.S.C. 154(b) by 1314 days.

(21) Appl. No.: 11/774,735

(22) Filed: Jul. 9, 2007

(65) Prior Publication Data
US 2009/0013530 A1 Jan. 15, 2009

(51) Int. Cl.
*B21D 53/00* (2006.01)
(52) U.S. Cl. ............. 29/890.1; 60/754; 60/772
(58) Field of Classification Search ........... 29/889.1, 29/889.2, 890.01, 890.02; 60/754, 772; 219/121.71
See application file for complete search history.

(56) References Cited

U.S. PATENT DOCUMENTS

| | | | |
|---|---|---|---|
| 4,016,396 A | 4/1977 | Hassan et al. | |
| 4,719,748 A | 1/1988 | Davis, Jr. et al. | |
| 4,952,789 A | 8/1990 | Suttie | |
| 4,973,819 A | 11/1990 | Thatcher | |
| 5,037,183 A | 8/1991 | Gagosz et al. | |
| 5,117,087 A | 5/1992 | Baker et al. | |
| 5,223,692 A | 6/1993 | Lozier et al. | |
| 5,233,150 A | 8/1993 | Schneebeli et al. | |
| 5,453,933 A | 9/1995 | Wright et al. | |
| 5,916,462 A | 6/1999 | James et al. | |
| 6,032,361 A | 3/2000 | Makino et al. | |
| 6,034,349 A | 3/2000 | Ota | |
| 6,144,007 A | 11/2000 | Levin | |
| 6,367,359 B1 | 4/2002 | Ropos | |
| 6,419,426 B1 | 7/2002 | Chalupa et al. | |
| 6,541,732 B2 | 4/2003 | Hirose et al. | |
| 6,648,583 B1 | 11/2003 | Roy et al. | |
| 6,649,864 B2 | 11/2003 | De Steur et al. | |
| 6,655,247 B1 | 12/2003 | Walker et al. | |
| 6,734,390 B1 | 5/2004 | Frye | |
| 6,738,691 B1 | 5/2004 | Colgate et al. | |
| 6,769,194 B2 | 8/2004 | Hennessey | |
| 6,808,344 B2 | 10/2004 | Chen | |
| 7,669,422 B2 * | 3/2010 | Suleiman et al. ........... 60/772 |
| 7,812,282 B2 * | 10/2010 | Kuhn et al. ........... 219/121.71 |
| 2004/0126198 A1 | 7/2004 | Chen | |
| 2004/0194569 A1 | 10/2004 | Hermoso | |
| 2004/0255696 A1 | 12/2004 | Helmer et al. | |

(Continued)

FOREIGN PATENT DOCUMENTS

CA 2381018 4/2001

(Continued)

OTHER PUBLICATIONS

Brochure, "PolyWorks—Total Point Cloud Inspection and Reverse-Engineering Software Solution"—InnovMetric Software Inc.

(Continued)

*Primary Examiner* — Richard Chang
(74) *Attorney, Agent, or Firm* — Norton Rose Canada LLP

(57) ABSTRACT

A method of producing a plurality of effusion holes in a wall of a combustor of a gas turbine engine comprises: determining a hole pattern definition which provides a functional relationship of the spacing between each adjacent hole within the row of holes; using the hole pattern definition to identify individual positions of the effusion holes to be produced; and using a hole producing system to produce the effusion holes at the identified positions.

10 Claims, 3 Drawing Sheets

U.S. PATENT DOCUMENTS

2007/0051707 A1    3/2007    Elfizy

FOREIGN PATENT DOCUMENTS

| CA | 2328283 | 6/2001 |
|---|---|---|
| EP | 0 339 888 | 11/1989 |
| EP | 0 486 133 | 5/1992 |
| EP | 1084371 | 9/2003 |
| WO | WO 00/15383 | 3/2000 |

OTHER PUBLICATIONS

Brochure, "Online 3D Gauging—Flexible Online 3D Gauging Solution"—Orus Integration Inc.

Brochure, 3D Series—Three-Dimensional (X, Y, Z) Inspection System—Orus Integration Inc.

Asakawa, N. et al., "Automation of Chamfering by an Industrial Robo: for the Case of Machined Hole on a Cylindrical Workpiece", Proceedings of the 1998 IEEE International Conference on Robotics & Automation, Leuven, Belgium, May 1998.

Koseki, Y. et al., "Design and Accuracy Evaluation of High-Speed and High Precision Parallel Mechanism", IEEE International Conference on Robotics and Automation, vol. 3, pp. 1340-1345, 1998.

International Search Report of PCT/CA2008/001166.

* cited by examiner

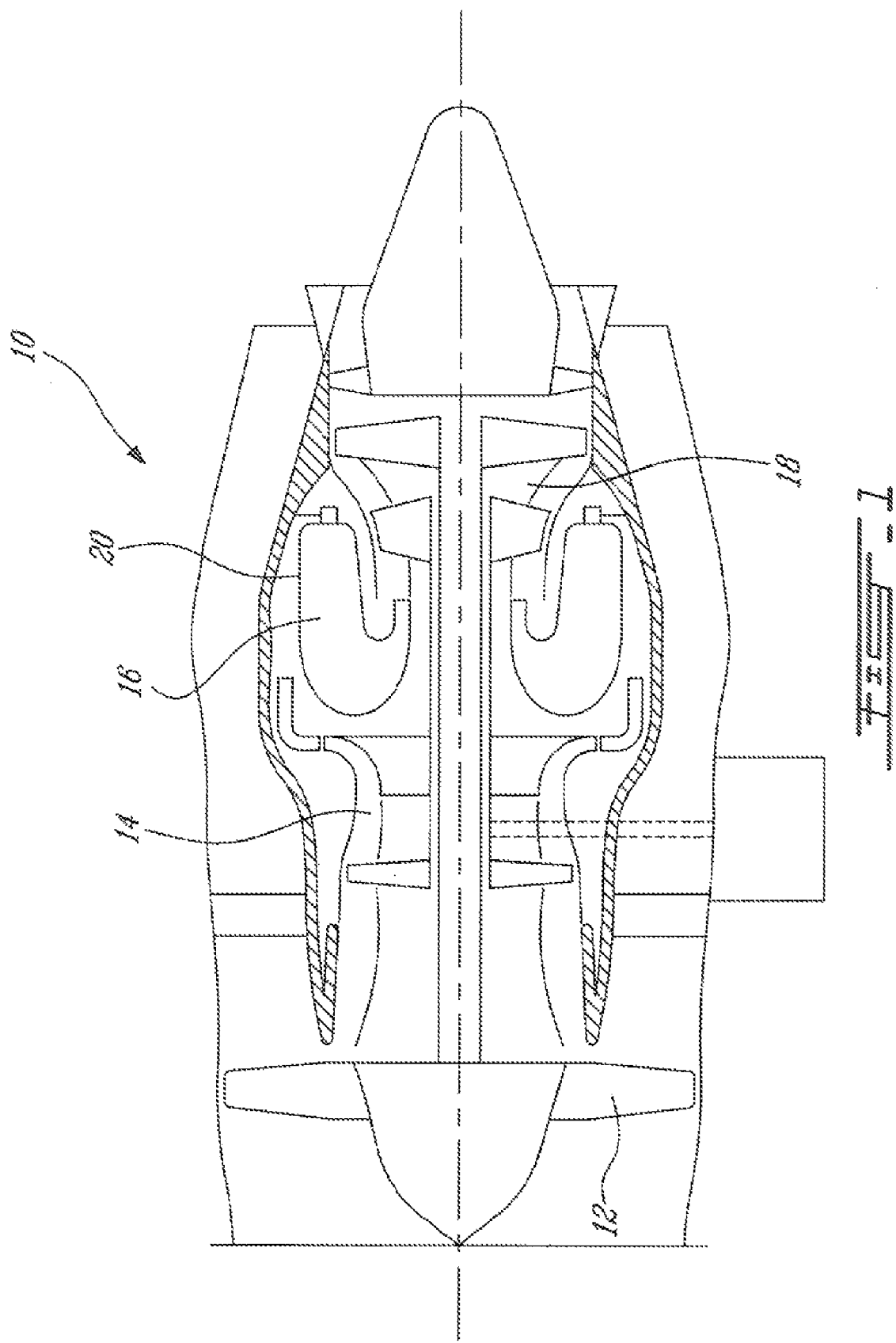

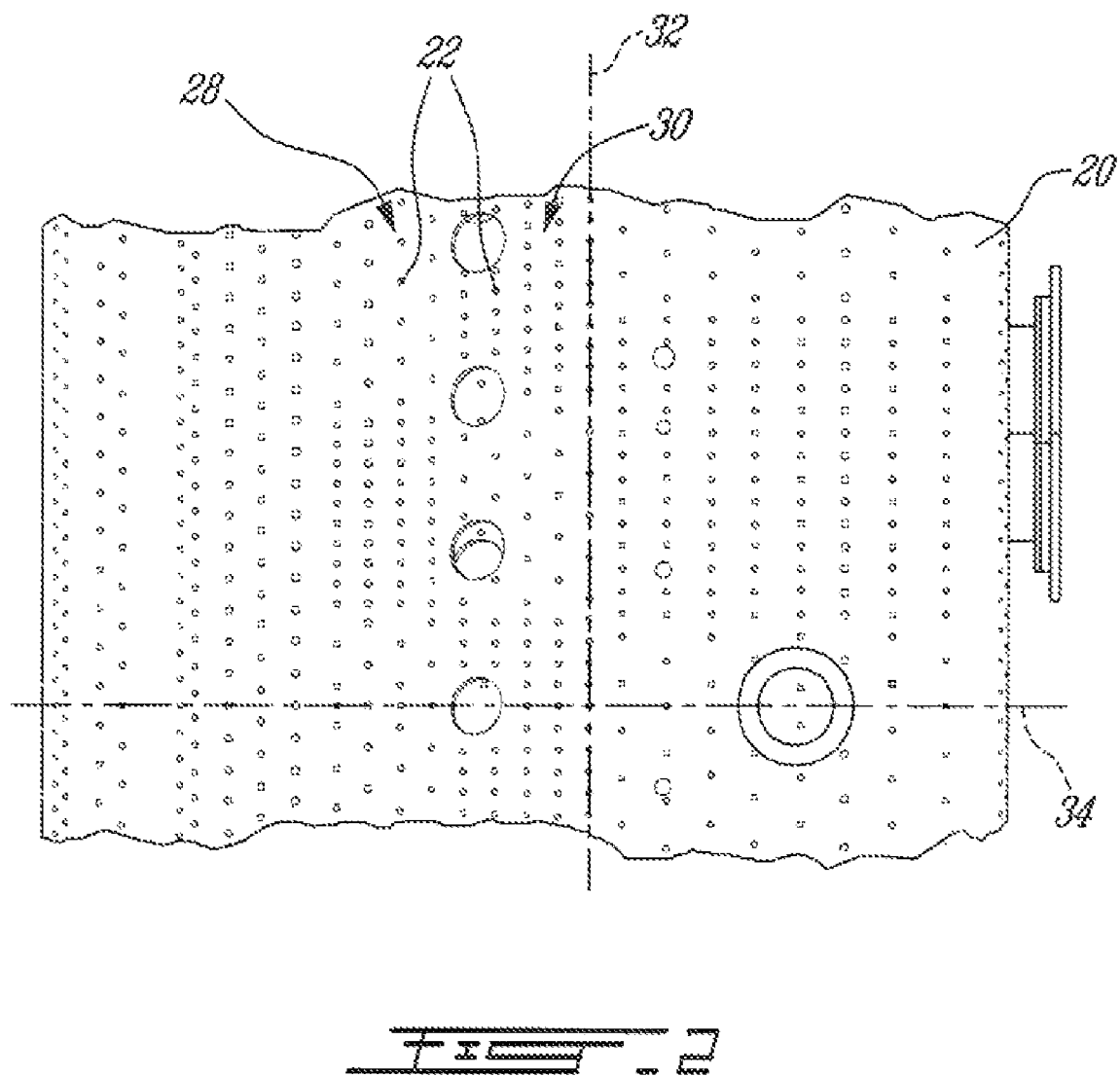

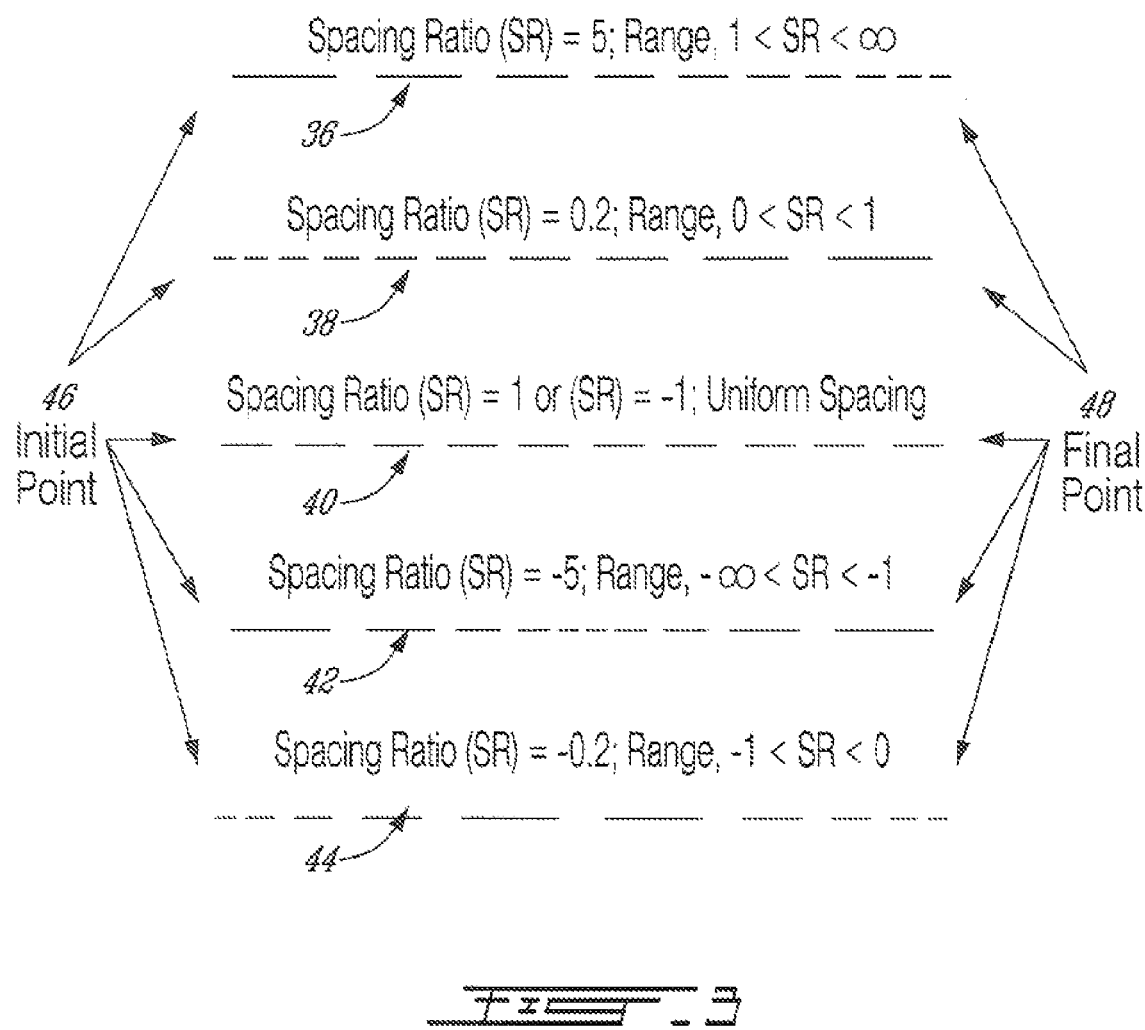

METHOD OF PRODUCING EFFUSION HOLES

TECHNICAL FIELD

The invention relates generally to gas turbine engines and, more specifically, to a method of forming effusion holes in a combustor of a gas turbine engine.

BACKGROUND OF THE ART

Cooling of combustor walls is typically achieved by directing cooling air through holes in the combustor walls to provide effusion and/or film cooling. Holes formed in a predetermined pattern directly through a sheet metal liner of the combustor walls allowing pressurized cooling air to enter the combustion chamber and thereby cool the combustor.

The effusion holes in the combustor walls are typically produced using a laser drilling system. During laser drilling, a laser head and a workpiece are typically moved relative to the each other on a manipulation system such as a computer numerical control (CNC) motion system in order to drill each individual hole. In order to achieve optimum cooling within the combustor, a non-uniform hole pattern is often required. Accordingly, a hole pattern designed for optimum effectiveness may comprise variations in hole density, which results in a hole pattern definition that is often complex. This in tarn requires a significant amount of time to set up the laser drilling system, as positional data for each individual hole must be defined and supplied to the CNC motion system.

Current methods of defining complex hole patterns require that the drilling of the effusion holes be done in two stages, wherein a coarser base hole pattern is first drilled, and then, one or more finely-spaced holes are drilled between the base holes to define areas with a higher hole density where additional cooling is required. This requires unnecessary and time-consuming repositioning moves by the laser drilling system which add to the cost of manufacturing the parts. There is thus a need for an improved method of drilling the effusion holes which minimizes manufacturing costs of effusion cooled parts.

SUMMARY

Accordingly, it is an object of the present invention to provide a method of producing effusion holes which addresses the above mentioned concerns.

According to one aspect there is provided a method of producing a plurality of effusion holes in a wall of a combustor of a gas turbine engine, the method comprising the steps of: a) determining a hole pattern definition using: a count of the holes to be separated by first spaces is a row of holes along a first axis, positional information of a first hole in the row of holes, a first length of the row of holes, and, a first spacing ratio relating hole spacing distances between each adjacent hole within the row of holes; b) using the hole pattern definition to identify individual positions of fee effusion holes to be produced in the wall of the combustor; and c) using a hole producing system to produce the effusion holes in the wall of the combustor at the identified positions.

According to another aspect, there is provided a method of determining individual positions of effusion holes in a wall of a combustor of a gas turbine engine, the method comprising the steps of: a) using a geometric relation that relates relative spacing distances between each of the effusion holes separated by spaces in a row of holes to each other, the geometric relation being $L_1 = aL_2 = a^2L_3 = a^3L_4 = a^{n-1}L_n = (SR)L_n$, where $L_1$ is a first spacing distance, 'a' is a constant, 'n' if is a count of the spaces in the row of holes, $L_n$ is a spacing distance associated with a space number n, and, 'SR' is a spacing ratio which is equal to $a^{n-1}$ and provides a functional relationship between spacing distances of any adjacent hole within the row of holes; and b) using positional information of a first hole in the row of holes, a count of the holes and a length of the row of holes to determine the position of any of the effusion holes within the row of holes in accordance with the geometric relation.

There is further provided, in accordance with another aspect, a system for producing a plurality of spaced holes in a component, the system comprising: a hole producing machine; a control system, in communication with the hole producing machine; a hole pattern definition module which provides instructions to the control system for operating and controlling the hole producing, machine, the hole pattern definition module determining a desired distribution of the effusion holes in the component using predetermined input parameters, the distribution of effusion holes being, determined in accordance with the geometric relation $L_1 = aL_2 = a^2L_3 = a^3L_4 = a^{n-1}L_n = (SR)L_n$, where $L_1$ is a first spacing distance, a is a constant, n is a count of the spaces in a row of holes, $L_n$ is a spacing distance associated with a space number n, and, SR is the first spacing ratio which is equal to $a^{n-1}$; the predetermined input parameters including: a count of the holes to be separated by spaces in the row of holes along a first axis; positional information of a first hole in the row of holes; a first length of the row of holes; and a first spacing ratio SR relating spacing distances between each adjacent hole within the row of holes.

Further details of these and other aspects of the present invention will be apparent from the detailed description and figures included below.

DESCRIPTION OF THE DRAWINGS

Reference is now made to the accompanying figures, in which:

FIG. 1 is a schematic axial cross-section view of a gas turbine engine;

FIG. 2 is a partial side view of a combustor wall having a pattern of effusion holes drilled therein; and FIG. 3 is a graphical representation of possible hole pattern definitions according with the present invention.

DETAILED DESCRIPTION OF THE PREFERRED EMBODIMENTS

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The combustor 16 comprises a combustor wall 20 which is made from sheet metal. It will be understood however that the invention is equally applicable to other types of gas turbine engines such as a turbo-shaft, a turbo-prop, or auxiliary power units.

Referring to FIG. 2, a number of effusion holes 22 are provided in the combustor wall 20 and may be drilled at an inclined angle relative to a normal direction of the combustor wall 20. The combustor wall 20 surrounds the combustion chamber in which hot combustion gas is produced. The effusion holes 22 allow pressurized cooling air outside of the combustor wall 20 to enter into the combustion chamber and thereby cool the combustor 16 by a transpiration or effusion cooling technique.

The number and spacing of the effusion holes 22 (i.e. hole density) can be determined in accordance with the desired performance characteristics of the combustor 16. For example, regions of local higher temperature (hot spots) within the combustor may require more cooling than other regions, and therefore more effusion holes 22 may be required to deliver more cooling air to those specific regions. A hole pattern with suitable hole densities may be selected based on performance or design requirements and determined using modelling techniques, experimentation or other conventional methods. In the pattern of effusion holes 22 shown in the combustor wall 20 of FIG. 2, a region of lower hole density is shown generally at 28 and a region of higher hole density is shown generally at 30. The hole pattern comprises a plurality of rows of spaced holes 22 oriented along a circumferential direction 32 of the combustor 16 and the rows are spaced apart in an axial direction 34 of the combustor 16.

Drilling a large number of holes in parts such as the combustor wall 20 according to a relatively complex hole pattern, can be time consuming. High speed laser drilling methods such as drilling-on-the-fly (DOF) are thus preferably used. DOF is described in more detail in U.S. application Ser. No. 11/218,785 filed on Sep. 6, 2005, the contents of which are incorporated herein by reference. During laser drilling, a pulsed laser suitable for drilling into the combustor wall 20 is used to produce each individual hole 22 in the combustor wall 20. While using the drilling-on-the-fly (DOF) method, the relative movement between the laser head and the combustor wall 20 when moving from one hole 22 to the next is executed between two individual pulses. Accordingly, the shutter does not need to be repeatedly closed and opened between each hole. This results in significant time savings.

On a laser drifting system that uses the DOF method, the part to be drilled is rotated at a constant RPM while the frequency of the laser is set to a constant value. For thinner parts, only one single pulse may be required to produce each effusion hole 22, and the laser drilling system may easily be configured to drill equally spaced holes 22 around an annular combustor wall. Generally three pulses are required to produce each effusion hole 22 in the combustor wall 20 depending on the system configuration and process conditions.

The task configuring the laser system for drilling effusion holes 22 according to a more complex pattern however is more complicated. In known techniques, the positional data of every hole 22 in fee pattern must be supplied to the laser drilling system, and the drilling of the effusion holes 22 is typically done in two stages, wherein a coarser base hole pattern is first drilled and then one or more finely-spaced holes are drilled between the base holes to produce regions with a higher hole density.

In accordance with one aspect of the present method, an improved means of defining a complex effusion hole pattern is possible which results in significant time savings with respect to the configuration of the laser drilling system and also the process of drilling the holes 22. In accordance with one embodiment, the spacing of the holes 22 along each row of holes 22 in the combustor wall 20 is defined using the geometric relation shown below as equation 1:

$$L_1 = aL_2 = a^2 L_3 = a^3 L_4 = a^{n-1} L_n = (SR) L_n \quad (1)$$

where SR is the spacing ratio and is equal to $a^{n-1}$, $L_1, L_2 \ldots L_n$ are spacing distances between adjacent holes 22 in the row, n is the number of spaces (i.e. number of holes−1) in the row and a is a constant. It is evident from equation 1 above that the spaces between every adjacent holes in a row that is defined by equation 1 are related to each other. Therefore, in order to determine the position of all the holes in a particular row, only the positional information of one hole serving as an anchor hole, the number of holes in the row, the length of the row and the spacing ratio SR must be known. The spacing ratio SR is selected based on a desired hole pattern. The spacing distances (e.g. $L_1, L_2 \ldots L^n$) and the value of the constant a are then derived from equation 1.

The spacing ratio SR comprises an exponential function which comprises a constant base a to the power (n−1). Once a particular hole pattern is defined based on performance and/or design requirements of the combustor 16, the value of the spacing ratio SR is determined by the designer. The value of SR can be chosen such that virtually any hole pattern can be represented by equation 1. FIG. 3 provides a graphical illustration of examples of different hole patterns, shown generally at 36, 38, 40, 42 and 44, obtained from the equation when different values of SR are selected. The initial hole for each pattern is shown generally at 46 and the final hole for each pattern is shown generally at 48.

As seen in pattern 36, for SR>1, the hole spacing decreases progressively from the initial hole 46 to the final hole 48. In pattern 38, 0<SR<1 and the hole spacing increases progressively from the initial hole 46 to the final hole 48. For SR=1 a hole pattern 40 is shown having a uniform hole spacing. In the above cases the SR is defined as the nominal ratio of the last spacing distance to the first spacing distance.

The use of equation 1 for determining individual spacing distances for a hole pattern defining a hole spacing which decreases progressively from the initial hole 46 to the final hole 48 is further illustrated with the numerical example 1 shown below.

NUMERICAL EXAMPLE 1

SR>1

Values Provided:
L=5.0"=total length of hole pattern or row of holes
n=5=number of spaces=number of holes−1
SR=2
Determining the Value of Constant a:
$a^{n-1} = SR$;
$a^{5-1} = 2$;
a=1.18921
Determining Spacing Distances:
$L = 5.0" = L_1 + L_2 + L_3 + L_4 + L_5$
$L_1 = a^{n-1} L_n = (1.18921)^4 L_5$
$L_2 = a^{n-2} L_n = (1.18921)^3 L_5$
$L_3 = a^{n-3} L_n = (1.18921)^2 L_5$
$L_4 = a^{n-4} L_n = (1.18921)^1 L_5 = (1.18921) L_5$
$L_5 = a^{n-5} L_n = (1.18921)^0 L_5 = L_5$
$L = L_5 [(1.18921)^4 + (1.18921)^3 + (1.18921)^2 + (1.18921) + 1] = 5.0"$
$L_5 = 0.68632"$
$L_1 = 1.37265"$
$L_2 = 1.1543"$
$L_3 = 0.9706"$
$L_4 = 0.8162"$ Using equation 1, it is also possible to define hole patterns where the spacing gradually decreases or increases from the initial hole 46 towards the center of the pattern and then gradually returns to an initial spacing distance towards the final hole 48. These types of hole patterns are also illustrated in FIG. 3. In these cases, a local hole pattern definition is essentially mirrored about the center of the global hole pattern that is desired. This technique produces a global hole pattern that is symmetrical about its center. For the purpose of differentiating this type of hole pattern from a gradually increasing or decreasing hole pattern, a negative SR can be specified instead of a positive SR. For example, a negative SR can be used to indicate to the hole producing system that the mirroring operation is required. In the case of a symmetrical hole pattern, the SR is defined as the nominal ratio of the center spacing distance to an end (initial or final) spacing distance.

As shown in pattern 40 of FIG. 3, when SR=1 or −1, a uniform hole spacing is obtained. In pattern 42, SR<−1 and a denser spacing is found in the center of the hole pattern 42. Pattern 44 shows the effect of −1< SR< 0 wherein a coarser hole spacing is obtained in the center of the hole pattern 44.

The use of equation 1 for determining individual spacing distances for a symmetrical hole pattern having a hole spacing that is denser at its center is further illustrated with the numerical example 2 shown below.

NUMERICAL EXAMPLE 2

SR<0

Values Provided:
L=5.0"=total length of hole pattern or row of holes (global pattern)
n=5=number of spaces=number of holes−1
SR=−2
Determining Constant a: Consider Half of the Global Pattern for Mirroring
n=3=5/2 (rounded to nearest integer)
L=5.0/2=2.5"
$a^{n-1}$=SR;
$a^{3-1}$=|−2|;
a=1.4142
Determining Spacing Distances:
L=5.0"=$L_1$+$L_2$+$L_3$+$L_4$+$L_5$
$L_1$=$L_5$=$a^{n-1}L_n$=$a^2L_3$=$(1.4142)^2L_3$ (mirroring)
$L_2$=$L_4$=$a^{n-2}L_n$=$aL_3$=$(1.4142)L_3$ (mirroring)
$L_3$=$a^{n-3}L_n$=$(1.4142)^0L_3$=$L_3$
L=$L_3$[2$(1.4142)^2$+2(1.4142)+1]=5.0"
$L_3$=0.6387"
$L_1$=$L_5$=$(1.4142)^2L_3$=1.2774"
$L_2$=$L_4$=$(1.4142)L_3$=0.9033"

In order to produce effusion hole patterns which comprise multiple rows, the same equation can also be used to define the axial spacing between each row. The value of $L_1$ then becomes the first row spacing, the value of SR is selected based on the desired row spacing and n becomes the number of rows in the hole pattern. The length L becomes the distance across which the rows are spaced. Positional information of a first row of holes is also required and may be determined based on the positional information of the first hole in the first row. Therefore the positional information of the first hole (anchor hole) may be used as a reference from which the position of individual holes in each row and the position of each row in the pattern are determined.

The use of such a hole pattern definition results in significant time savings as positional data for every hole 22 in a row or pattern is not required and therefore need not be supplied to the laser-drilling system. The position of all the holes 22 in the row are interrelated and defined by the geometric relation representing the selected hole pattern definition. Also, all the holes 22 in a row can be drilled sequentially using the DOF method. Typically, effusion holes 22 in a combustor wall 20 are drilled using a constant laser pulse frequency with the combustor 16 rotating at a constant speed. In order to drill the effusion holes 22 sequentially using the geometric relation represented by equation 1, a variable pulse frequency and/or a variable rotating speed may be used.

For a CNC based laser-drilling system, the CNC controller can be configured, by implementing a hole pattern definition module through the use of custom macros and/or subroutines, to accept the necessary input parameters (position of first hole, number of holes, L and SR) and automatically determine the position of every hole 22 in the row based on the geometric relation represented by equation 1. Through the use of the hole pattern definition module, the CNC controller can then produce instructions for the laser drilling system to drill the complete row of holes 22 sequentially based only on the parameters supplied.

A person skilled in the art will appreciate that equation 1 is a generic geometric relation that can be used to represent virtually any hole pattern desired. However, modifications to equation 1 may be made or other more specific equations may also be used to represent particular hole patterns. Once a designer has determined a desired effusion hole pattern based on performance characteristics or requirements of the combustor, a specific equation may be determined using, for example, curve fitting methods to represent the spacing values of the desired hole pattern. For example, in the case of a more simple effusion hole pattern having spacing values that are linearly decreasing, the following equation 2 could be used:

$$Ln=L1-SR(n-1) \qquad (2)$$

where the spacing ratio SR is a constant value such as 0.1. In this specific example, provided a first spacing value L1=1.0, the remaining spacing values would be L2=0.9, L3=0.8 and so forth. Alternatively, specifying a negative SR value in equation 2 would produce a linearly increasing effusion hole pattern.

The above description is meant to be exemplary only, and one skilled in the art will recognize that changes may be made to the embodiments described without department from the scope of the invention disclosed. For example, the use of equation 1 is not limited to defining effusion holes 22 to be drilled in walls 20 of combustors 16 for gas turbine engines 10. It is apparent that it can also be used with other coordinate generation techniques where complex spacing and positions of features are represented. For example, a person skilled in the art would appreciate that this method of representing spacing patterns can also be used in conjunction with other manufacturing processes such as conventional milling and drilling, electrical discharge machining (EDM), processes requiring, numerically controlled motion systems and other similar processes. Still other modifications which fall within the scope of the present invention will be apparent to those skilled in the art, in light of a review of this disclosure, and such modifications are intended to fall within the appended claims.

The invention claimed is:

1. A method of producing a plurality of effusion holes in a wall of a combustor of a gas turbine engine, the method comprising the steps of:
   a) determining a hole pattern definition using: a count of the holes to be separated by first spaces in a row of holes along a first axis, positional information of a first hole in the row of holes, a first length of the row of holes, and, a first spacing ratio relating hole spacing distances between each adjacent hole within the row of holes, and further comprising determining the hole pattern definition using the geometric relation $$L_1=aL_2=a^2L_3=a^3L_4=a^{n-1}L_n=(SR)L_n,$$

where $L_1$ is a first hole spacing distance, a is a constant, n is the number of first spaces in the row of holes along the first axis, $L_n$ is a hole spacing distance associated with first space number n, and, SR is the first spacing ratio which is equal to $a^{n-1}$;
b) using the hole pattern definition to identify individual positions of the effusion holes to be produced in the wall of the combustor; and
c) using a hole producing system to produce the effusion holes in the wall of the combustor at the identified positions.

2. The method as defined in claim 1, wherein the hole pattern definition of step a) is determined by further using:
a count of rows of holes to be separated by second spaces along a second axis;
a second length through which the rows of holes are spaced along the second axis; and
a second spacing ratio relating row spacing distances between each adjacent row of holes along the second axis.

3. The method as defined in claim 2, wherein the first axis represents a circumferential direction of the combustor and the second axis represents an axial direction of the combustor.

4. The method as defined in claim 1, further comprising the step of i) designing a desired hole pattern for the effusion holes based on local hot spots within the combustor, prior to the determining step a).

5. The method as defined in claim 4, further comprising the step of ii) determining a suitable first spacing ratio based on the designed hole pattern of step i), prior to the determining step a).

6. The method as defined in claim 1, wherein the step of identifying the individual positions of the effusion holes further comprises mirroring the hole pattern.

7. A method of producing a plurality of effusion holes in a wall of a combustor of a gas turbine engine, the effusion holes being arranged in a hole pattern, the method comprising the steps of:

determining individual positions of said effusion holes arranged in the hole pattern by:
a) using a geometric relation that relates relative spacing distances between each of the effusion holes separated by spaces in a row of holes to each other, the geometric relation being $$L_1=aL_2=a^2L_3=a^3L_4=a^{n-1}L_n=(SR)L_n,$$

where $L_1$ is a first spacing distance, a is a constant, n is a count of the spaces in the row of holes, $L_n$ is a spacing distance associated with a space number n, and, SR is a spacing ratio which is equal to $a^{n-1}$ and provides a functional relationship between spacing distances of any adjacent hole within the row of holes; and
b) using positional information of a first hole in the row of holes, a count of the holes and a length of the row of holes to determine the position of any of the effusion holes within the row of holes in accordance with the geometric relation; and
using a hole producing system to produce the effusion holes in the wall of the combustor at the determined individual positions of said effusion holes.

8. The method as defined in claim 7, further comprising the steps of
c) using the geometric relation to relate relative spacing distances between a plurality of adjacent rows of holes by defining $L_1$ as a first row spacing, n as a count of the rows of holes and selecting SR based on a desired row spacing; and
d) using the positional information of a first row of holes, a count of the rows of holes and the distance across which the rows are spaced to determine the position of any of the adjacent rows of holes in accordance with the geometric relation.

9. The method as defined in claim 8, wherein the positional information of the first row of holes is determined from the positional information of the first hole.

10. The method as defined in claim 8, wherein the holes in each row of holes are to be spaced along a circumferential direction of the combustor and the rows of holes are to be spaced along an axial direction of the combustor.

* * * * *